Feb. 7, 1933.  W. WHITE  1,896,383
PIN SETTING MACHINE
Filed Dec. 10, 1929   8 Sheets-Sheet 1

INVENTOR
WILLIAM WHITE
ATTORNEY

Feb. 7, 1933.  W. WHITE  1,896,383
PIN SETTING MACHINE
Filed Dec. 10, 1929   8 Sheets-Sheet 2

INVENTOR
WILLIAM WHITE
George D. Richards
ATTORNEY

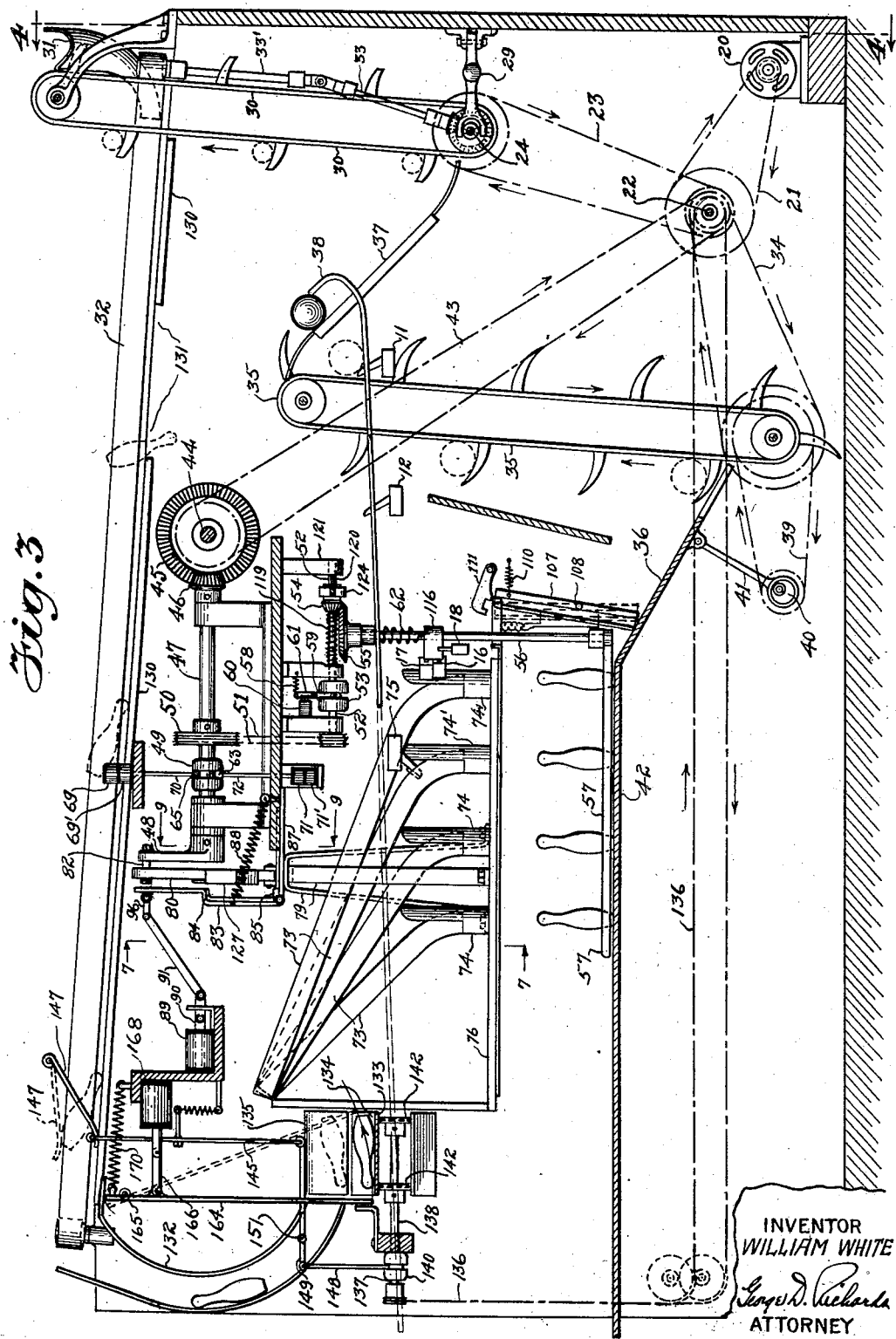

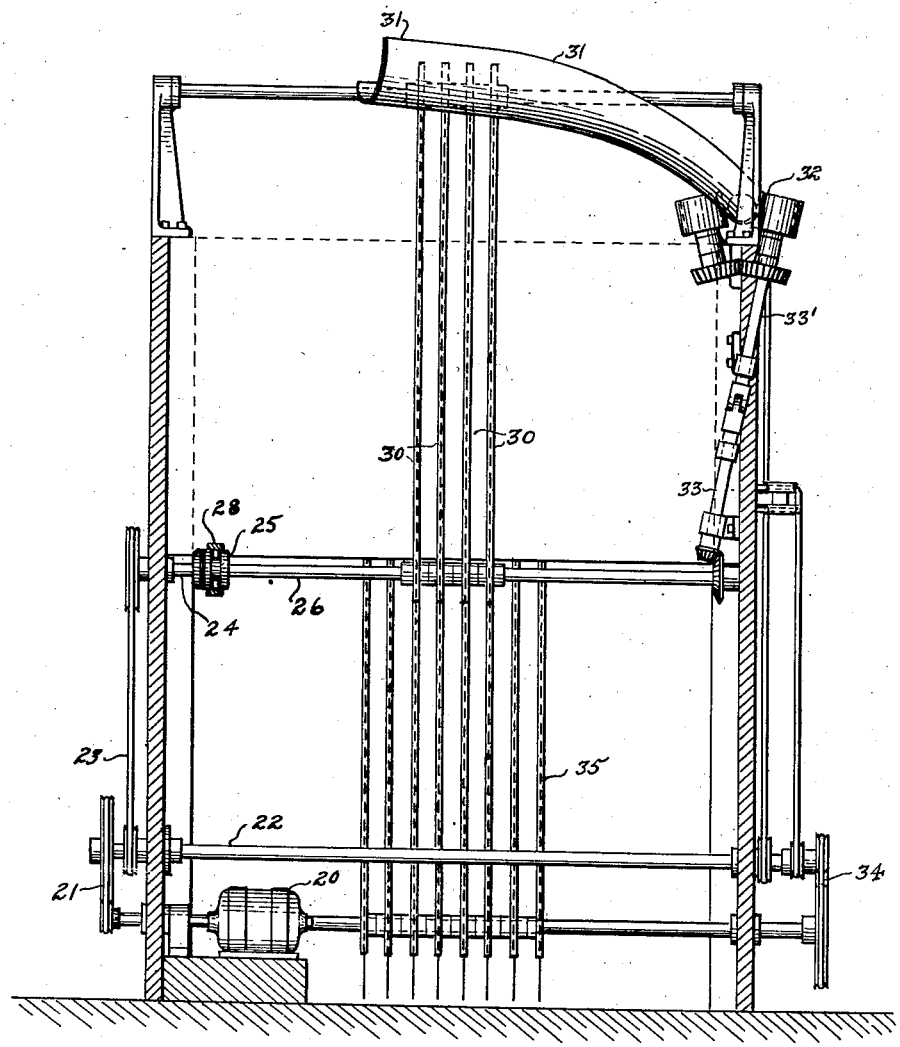

Feb. 7, 1933.  W. WHITE  1,896,383
PIN SETTING MACHINE
Filed Dec. 10, 1929  8 Sheets-Sheet 5
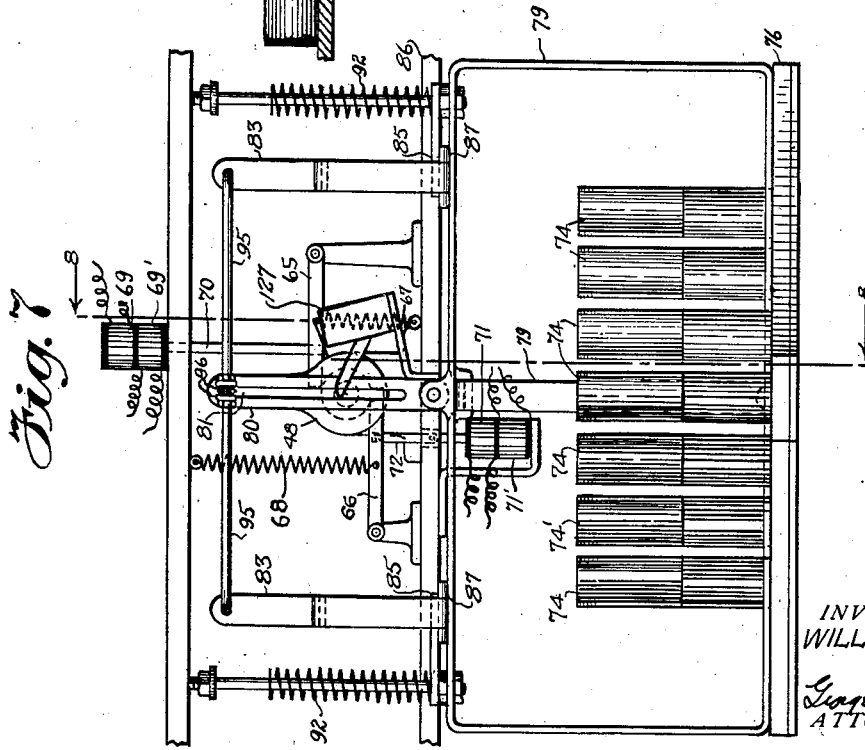
INVENTOR
WILLIAM WHITE
ATTORNEY

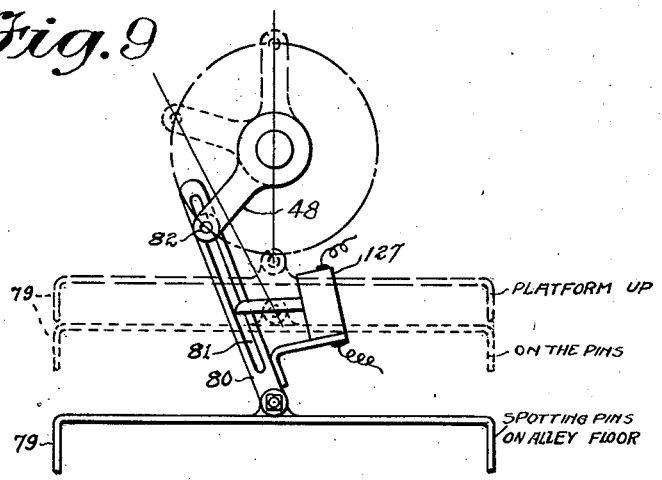
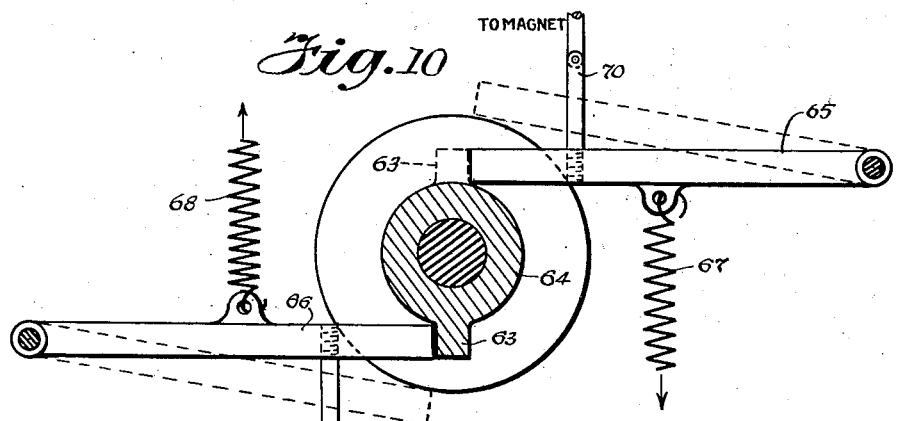
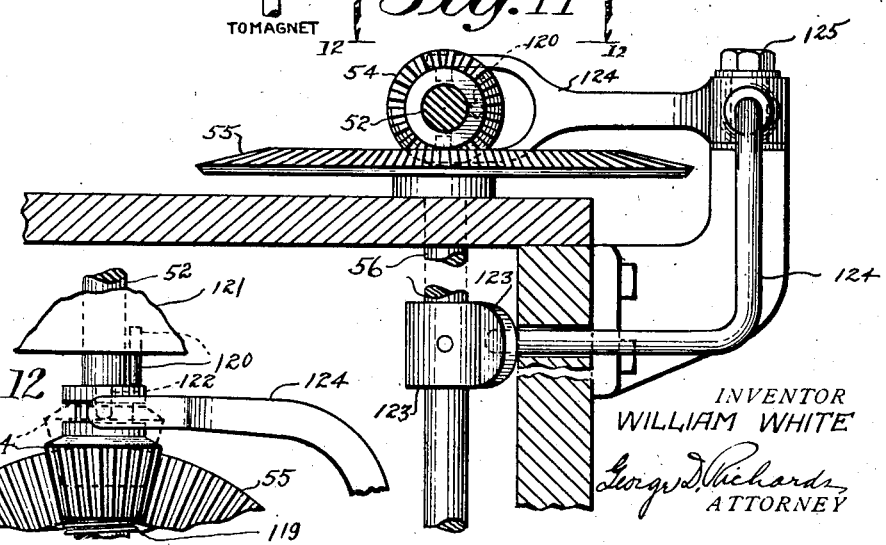
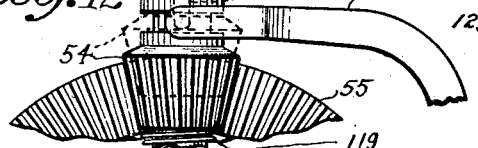

Feb. 7, 1933.   W. WHITE   1,896,383
PIN SETTING MACHINE
Filed Dec. 10, 1929   8 Sheets-Sheet 7
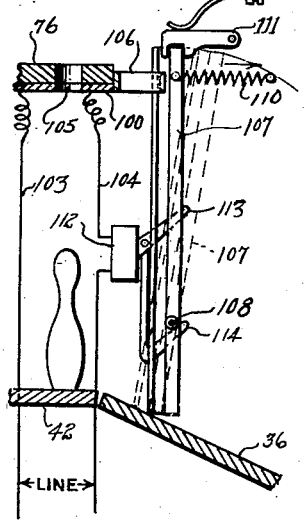
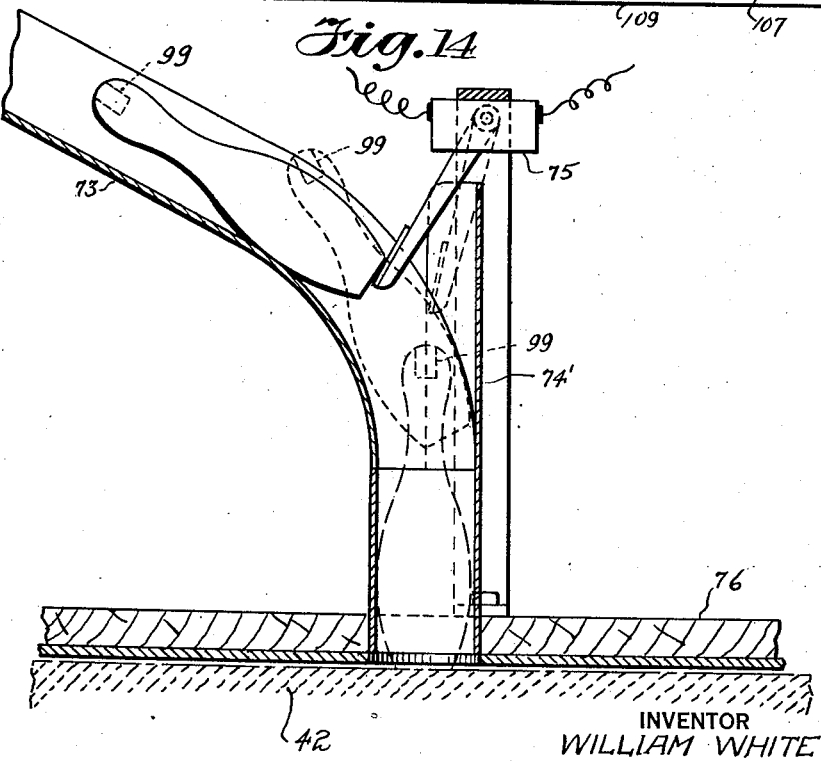
INVENTOR
WILLIAM WHITE
BY
ATTORNEY

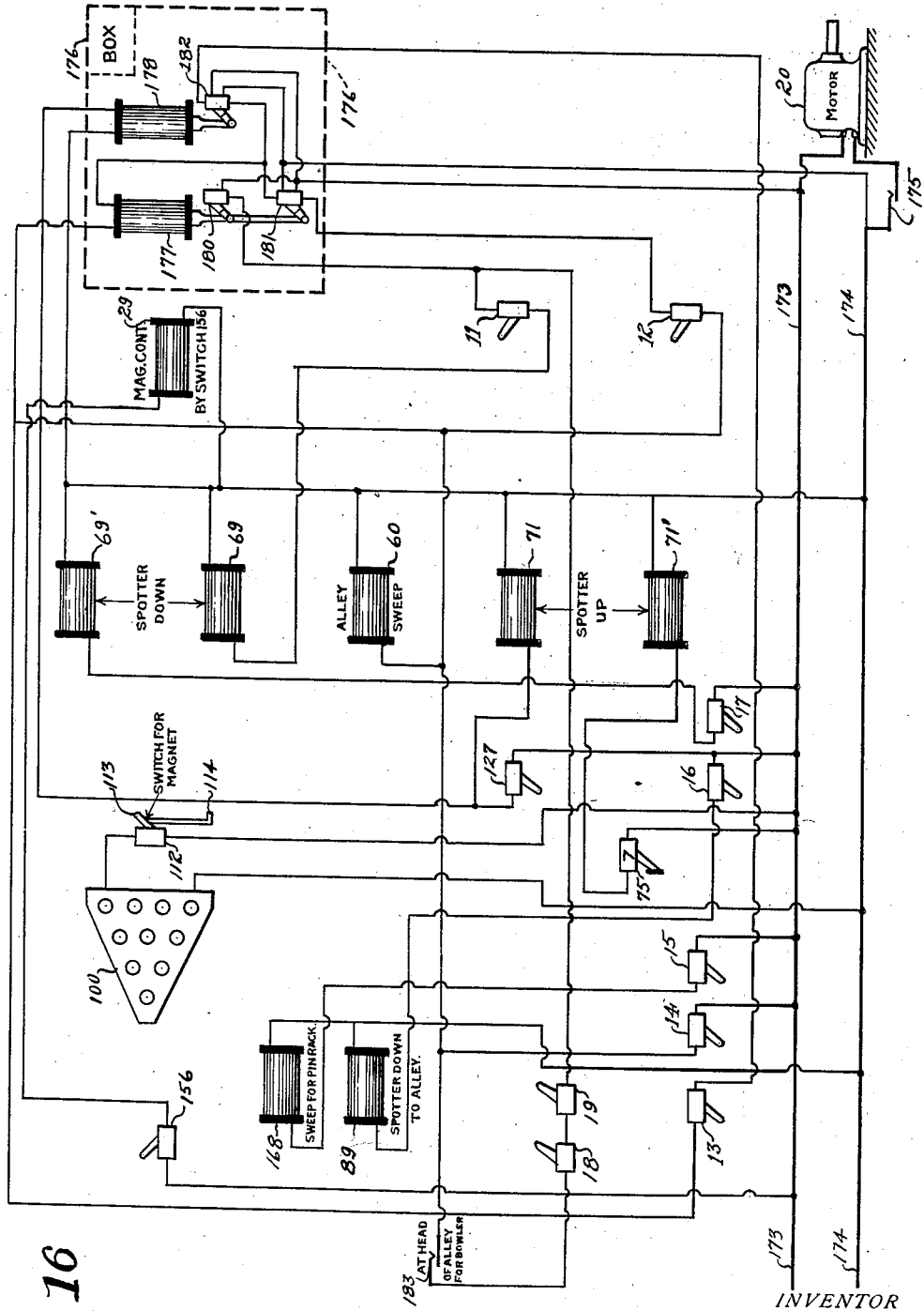

Patented Feb. 7, 1933

1,896,383

UNITED STATES PATENT OFFICE

WILLIAM WHITE, OF NEWARK, NEW JERSEY, ASSIGNOR TO MORTON L. ADLER, OF NEW ROCHELLE, NEW YORK, TRUSTEE

PIN-SETTING MACHINE

Application filed December 10, 1929. Serial No. 412,995.

The present invention relates, generally, to pin-setting machines for bowling alleys; and the invention has reference, more particularly, to a novel pin-setting machine having mechanically operative and electrically controlled parts for setting and resetting the pins; for clearing the alley of dead pins or of all pins, in a predetermined desired manner; for conveying the pins cleared from the alley back thereto and positioning the same as desired; for returning the ball from the back of the alley to the player's position, and for other purposes; and the invention relates further to a bowling alley which has parts automatically operative by electromotive means set off by a transient operation, such as the closing of an electric circuit by a moving bowling ball by a part of the machine or by hand, to dispose of the pins and ball in a predetermined manner.

Various objects and advantages of the invention will be obvious from the following particular description of one form of mechanism embodying the invention, or from an inspection of the accompanying drawings; and the invention also consists in certain new and useful features of construction and combinations and arrangements of parts hereinafter set forth and claimed.

In the accompanying diagrammatic drawings, an embodiment of the invention is shown in which:—

Fig. 3 is a sectional view taken along the line 3—3 of Fig. 1;

Fig. 4 is a sectional view taken substantially along the line 4—4 of Fig. 3;

Figure 1:
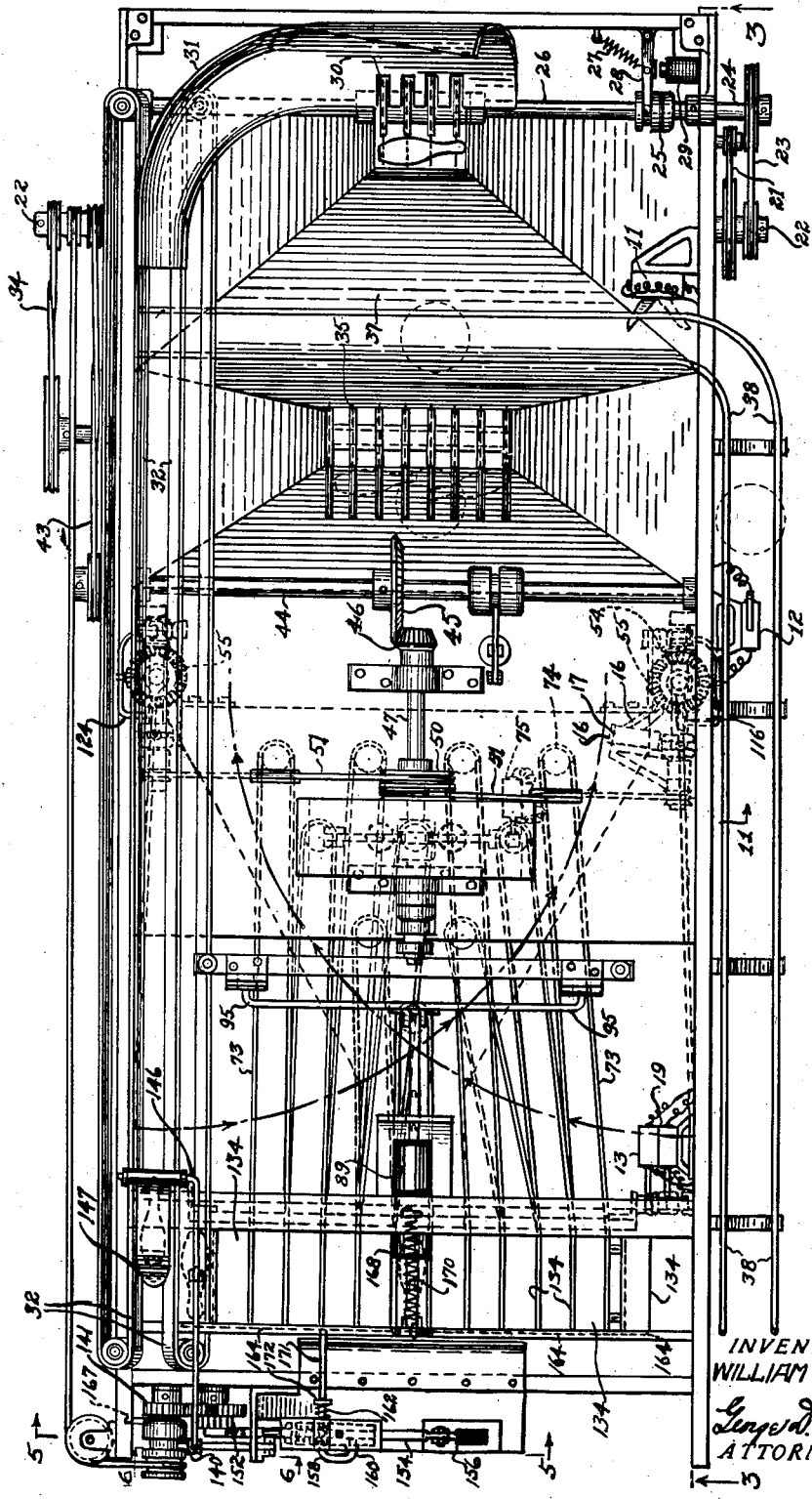
Fig. 1 is a plan view of the novel pin-setting machine of this invention applied to a bowling alley.
Figure 2:
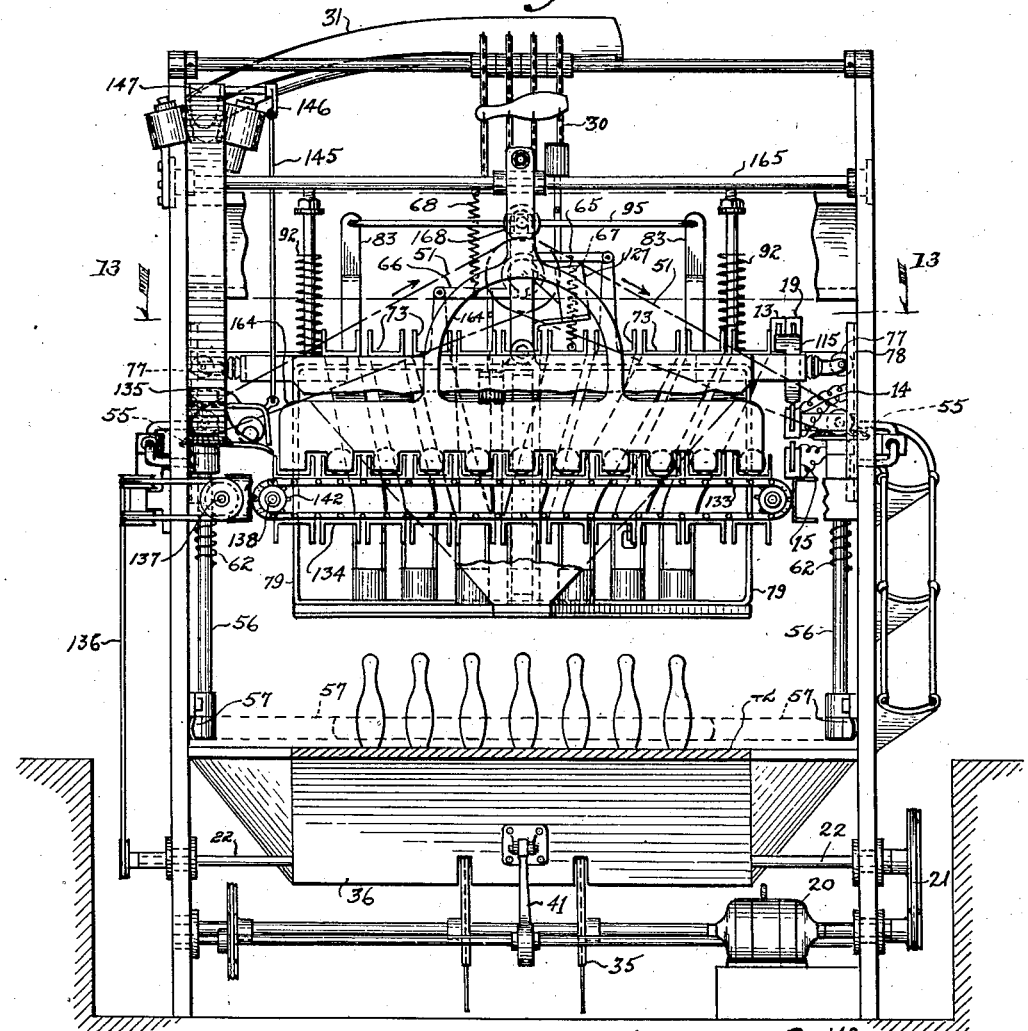
Fig. 2 is a front elevational view thereof with parts broken away.
Figures 5, 6:
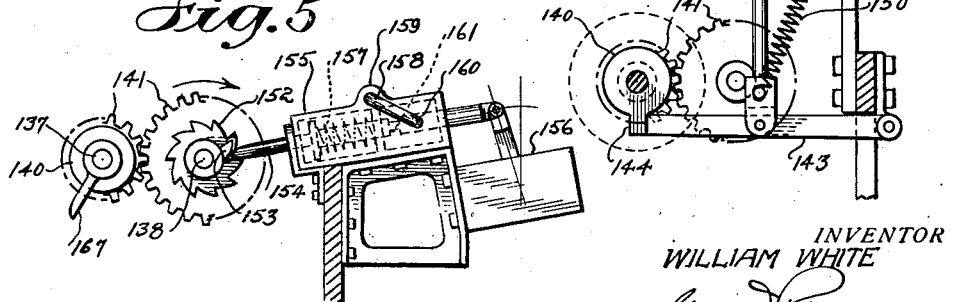

Figs. 5 and 6 are sections taken substantially along the lines 5—5 and 6—6, respectively, of Fig. 1;

Fig. 7 is a part sectional view taken along the line 7—7 of Fig. 3;

Fig. 8 is a sectional view taken along the line 8—8 of Fig. 7;

Fig. 9 is a part sectional view taken along the line 9—9 of Fig. 3;

Fig. 10 is a part sectional view taken along the line 10—10 of Fig. 8;

Fig. 11 is a fragmentary sectional view taken along the section line 11 of Fig. 1, looking in the direction of the arrow;

Fig. 12 is a part view in plan taken at the line 12—12 of Fig. 11;

Fig. 13 is a plan view in section taken on the line 13—13 of Fig. 2;

Fig. 14 is a sectional view taken along the line 14—14 of Fig. 13;

Fig. 15 is a sectional view taken along the line 15—15 of Fig. 14; and

Fig. 16 is a wiring diagram of electrical parts and connections of the apparatus.

The figures of the drawings are somewhat diagrammatic, and in some of the figures some of the parts have been omitted to better show the details of other parts.

Referring now to the drawings, which show the pit end of a bowling alley and details of parts thereat, the reference character 20 denotes an electric motor which, through a belt 21, drives a counter shaft 22. A belt 23 from said counter shaft 22 drives a shaft 24 which latter, through a clutch 25 drives the shaft 26 aligned with shaft 24. A coil spring 27, operating on the clutch lever 28, tends to hold said clutch 25 in its disengaged position and an electro-magnet 29, when energized, is adapted to act oppositely to spring 27 and by overcoming this spring to engage said clutch 25 to thereby connect said shafts 24 and 26 in driving relation. Said shaft 26 drives a pin elevator 30 which discharges into the curved chute 31 which latter discharges to the V-shaped conveyor 32—32 of the kind described and claimed in my Patent Number 1,712,186, issued May 7, 1929, to which reference is hereby made, the two belts 32 forming the conveyor being driven through said shaft 26 and the flexible shafts 33, 33'. Said V-shaped conveyor 32—32 is more fully described hereinafter in conjunction with other cooperating parts.

A belt 34 connects from said countershaft 22 and drives a ball and pin elevator 35 which extends upwardly from the alley pit floor 36 and discharges to a slideway 37 which extends downwardly to the lower end of said elevator 30. Across said slideway 37 there extends a ball guideway 38 comprising a suitably bent rod spaced sufficiently from slideway 17 to permit passage thereunder of pins and to catch balls and deliver them to the bowler's position at the head of the alley. A pair of switches 11 and 12 are positioned alongside of the ball guideway 38 and have their operating arms projecting into the path of travel of balls conveyed by guideway 38. These switches are spring biased to be normally open. A ball passing along this guideway strikes the operating arms of switches 11 and 12 and momentarily closes these switches in succession. A belt 39, driven through the lower shaft of said elevator 35, through connection by means of an eccentric 40 and a connecting rod 41, serves to agitate said pit floor 36, the latter being hinged at its forward end to the edge of the alley floor 42, whereby pins and balls passing thereto are worked down to the receiving end of said conveyors 35.

A belt 43, driven by said shaft 22, serves to drive a transverse shaft 44 (see Figs. 1 and 3), which latter, through a bevel gear 45 and pinion 46, drives a longitudinally disposed shaft 47, which latter in turn drives a crank arm 48 through a clutch 49. Said shaft 47 carries a double pulley 50 which, through a pair of belts 51, 51, drives a pair of shafts 52, 52, which are disposed one over each of the gutters of the alley. Each of said shafts 52, 52, by means of a clutch 53 and bevel pinion 54 and gear 55, drives a vertical shaft 56 which carries an alley sweep 57, one on each side of the alley. The mechanism of said clutch 53 is indicated diagrammatically in Fig. 3. A spring 58 acting through a lever 59 tends to hold said clutch 53 in the inoperative position and an electro-magnet 60 positioned to act on an armature 61 attached to said lever 59, when energized, is adapted to actuate said clutch 53 to move it into operative condition in which it is adapted to revolve pinion 54 through a single revolution to thereby move said sweep 57 through an angle of ninety degrees and then release the same; a torsion spring 62 about said shaft 56 then becoming operative to return said sweep to its original position.

Each of the bevel pinions 54 is splined on its shaft 52 and slidable longitudinally thereon. This pinion is constantly urged out of mesh with gear 55 by a compression spring 119 surrounding shaft 52. A pin 120 (see especially Figs. 11 and 12) projects from the hanger 121 and holds the pinion 54 in mesh with gear 55 during the operating movement of the sweep. A circular pin recess 122 is provided in the hub of pinion 54 and is adapted to receive the pin 120. Pinion 54 is so set on shaft 52 that at the end of the sweep operating movement the recess 122, turning with pinion 54 arrives opposite pin 120, whereupon the spring 119 forces pinion 54 along shaft 52 and out of mesh with gear 55, thereby enabling spring 62 to return the sweep to its initial position at the side of the alley. As the sweep reaches the side of the alley a cam 123 carried by shaft 56 strikes a shifting lever 124 pivoted at 125 which acts to shift pinion 54 into mesh with gear 55 against the tension of spring 119 preparatory to another operating movement of the sweep.

A lever 116 is fixed on shaft 56 of one of the sweeps and by engaging the operating arms of a pair of switches 16 and 17 is adapted to momentarily close these switches as the sweep returns to its original normal position at the side of the alley. An additional switch 18 is held in closed position by lever 116 while the sweep is in its normal inoperative position at the side of the alley. This switch opens as soon as the sweep moves from this inoperative poition.

Said clutch 49 on shaft 47 is a spring friction clutch which tends at all times to be operative. Its operation however is controlled through a lug 63 (see Fig. 10) carried by a boss 64 on said crank 48, the former when held being operative to overcome the friction of clutch 49 and to hold said crank 48 against movement. For this purpose there is provided a pair of hinged arms 65 and 66, respectively, the free end of one being at one hundred and eighty degrees from the free end of the other, and each of said ends being adapted to ride on said boss 64 and to engage said lug 63. A pair of tension springs 67 and 68, respectively, tend to hold said arms 65 and 66 in riding engagement on said boss 64. (See also Figs. 7 and 10). Either one or the other of two electro-magnetc 69 and 69' operating on a hinge jointed armature 70 connected to said arm 65 is operative to move said arm 65 against the tension of said spring 67, whereby said lug 63 is released and crank 48 is free to move downwardly through one hundred and eighty degrees, when it will be stopped by the engagement of said lug 63 with the end of said arm 66. Electro-magnets 71 and 71' in a similar manner are individually adapted to act through an armature 72 to move said arm 66 to release said lug 63 and effect a half revolution of the crank 48 upwardly before its movement is stopped by arm 65 engaging lug 63.

Over the pin space of the alley is positioned a set of chutes 73, 73 and spotting tubes 74, 74, 74', one of which, tube 74', carries an electric switch 75 which is spring operated to be normally open and is adapted to be momentarily closed by a pin passing into said tube 74'. Said chutes 73 and tubes 74 are carried by a spotter platform 76 which has laterally extending rollers 77, 77 which ride in vertical guide channels 78, 78 (see Figs. 2 and 13). Platform 76 together with chutes 73 and tubes 74 form a spotter for spotting or placing pins in correct position on the alley floor. Extending upwardly from said platform 76 is a frame 79 which has pivoted centrally thereof an arm 80 (see especially Figs. 7 to 9) having therein a slot 81 through which extends a stud 82 that is fixed on said crank 48. When said crank 48 is at its uppermost position said stud 82 engages the upper end of said slot 81 and holds said platform 76 at its uppermost position, and when said crank is turned to its lowermost position it permits movement of said platform 76 down to the alley floor 42. In the event that the platform 76 is stopped at an intermediate position during its downward movement the stud 82 merely slides in the slot 81. A switch 127 which is normally open is supported on arm 80 and has its operating arm overlying slot 81. Should the stud 82 move downwardly sufficiently in slot 81 it will engage the operating arm of switch 127 (and close this switch momentarily). As will be described later, when the spotter platform 76 is resting on upright pins positioned on the alley floor, the switch 127 is operated by movement of stud 82.

As especially shown in Fig. 2, a pair of switches 13 and 19 which are normally open are positioned near the upper limit of travel of platform 76. Just before this platform reaches its uppermost position, a cam plate 115 carried thereby presses the operating arm of switch 13 thereby momentarily closing this switch. Switch 13 opens again just as the platform reaches its highest position. As the platform reaches its upper limit of travel cam plate 115 closes switch 19 which remains closed as long as the spotter is up. A pair of switches 14 and 15 which are normally open are positioned below switch 19. As platform 76 moves down to the alley floor, the cam plate 115 disengages switches 13 and 19 permitting these switches to open and successively engages the operating arms of switches 14 and 15 during its downward movement, thereby temporarily closing these switches in succession.

For holding said platform 76 at an intermediate position, for purposes hereinafter shown, a stop is provided comprising a pair of spaced upwardly extending bars 83 which are bent to form backwardly extending shoulders 84 which are adapted to engage the ends of horizontal brackets 85 attached to a part 86 of the general framework of the apparatus. Said bars 83 are carried by and are hingedly connected at their lower ends to the forward ends of plates 87 constituting parts of said frame 79. Bars 83 are interconnected near their upper ends as by transverse rods 95. A tension spring 88 extending between one of said bars 83 and the back end of a plate 87 tends to hold said bars 83 against the ends of said brackets 85. When said crank 48 rotates to its lowermost position, the upper edges of said brackets 85 engage said shoulders 84 and holds said platform 76 with chutes 73 and tubes 74 at an intermediate distance, leaving a space underneath of about five inches for the said sweeps 57, 57 to operate to remove dead pins, all for purposes and functions hereinafter made clear.

For releasing said shoulders 84 from said brackets 85, to permit completion of the movement of platform 76 to the alley floor, there is provided an electromagnet 89 having operable therein an armature 90 which is pivotally connected to a rod 91, which in turn is pivotally connected by a rod 96 to the upper ends of rods 95 joining bars 83. When said shoulders 84 are in supported engagement with said brackets 85 and said electro-magnet 89 is energized, said armature 90 is drawn in, whereby said bars 83 are pivotally moved to disengage said shoulders 84 from brackets 85. The platform 76 with chutes 73 and tubes 74 will then fall the remainder of the way to the alley floor. For cushioning the fall of the spotter there is provided a pair of springs 92, 92 which rest at their lower ends upon the brackets 85 and are positioned in surrounding relation to bolts 93 that have their lower ends secured to the frame 79. The upper ends of these bolts 93 carry nuts and washers which engage the tops of springs 92 as the platform 76 falls, thereby effecting the cushioning of the platform movement.

Platform 76 is of substantially triangular shape in plan as shown especially in Fig. 13 and has a similarly shaped magnetic plate 100 slidably attached to the underside thereof. Screws 101 are threaded into platform 76 and extend through slots 102 provided in magnetic plate 100 and have their heads in supporting relation to the under surface of this magnetic plate. Magnetic plate 100 may be of substantial thickness such as three to five inches and has a magnetic coil or coils wound therein (not shown) in a manner well known to those skilled in the art and when electric current is supplied through the terminal leads 103 and 104 of this magneticplate, the same becomes magnetic and is used for the purpose of picking up pins in a manner to be further described. The pins used in the machine of this invention have magnetic inserts 99 (see Fig. 14) which enable the magnetic plate 100 to pack pins up as desired. Magnetic plate 100 is provided with circular apertures 105 therein which correspond in position and number to the spotting tubes 74. With the magnetic plate 100 in alignment with the platform 76 as shown in Fig. 15, the apertures 105 are aligned with the spotting tubes.

Magnetic plate 100 has a pair of brackets 106 attached to one end thereof. The free ends of brackets 106 project into the channelled recesses of channel members 107 that are pivotally connected at 108 to the frame 109. Coil springs 110 attached at one of their ends to the channel members 107 and at their other ends to the frame 109 tend to urge the channel members clockwise about the pivotal connections 108 as viewed in Fig. 15. Spring pressed latches 111 are biased to engage the tops of one of the flanges of channel members 107 to prevent movement of these channel members under action of springs 110. When platform 76 is at its highest position, the brackets 106 displace latches 111 from engagement with channel members 107 (see Fig. 3) and springs 110 hold brackets 106 outwardly so that apertures 105 are no longer aligned with the spotting tubes 74.

As platform 76 moves up and down the free ends of brackets 106 move within the channel recesses of the channel members 107. A switch 112 of the rachet type is connected in lead 104 and has its operating arm 113 and a trip arm 114 positioned to cooperate with one of the brackets 106. As this bracket moves down with platform 76 it will engage arm 113, thereby operating this switch 112 to either open or closed position depending upon the prior position of the switch. Should the platform 76 continue to move downward to the pivotal connections 108, the brackets will be forced inwardly toward platform 76 against the tension of springs 110 owing to the presence of pivotal connections 108, thereby again aligning apertures 105 with the spotting tubes 74. Still further movement of the platform will cause this bracket 106 to engage arm 114, thereby tripping switch 112 opening the same.

The V-shaped conveyor 32—32 conveys pins from the curved chute 31 toward the forward part of the machine. A guide member 130 having the form of a flat plate underlies the conveyor 32—32 in fixed spaced relation therefrom. As the pins are carried along by the conveyor, the heads of the pins ride on the guide member 130. A portion of this guide member is cut away at 131 so that the pins will be caused to approach the forward part of the machine with their bases forward as shown especially in Fig. 3. At the forward end of the machine these pins pass into a rearwardly curved chute 131 which delivers the pins with their heads forward to a point just above a transversely running belt 133 having pin pockets 134. A gate 135 controls the discharge of the pins from the chute 132 into the pin pockets 134 of belt 133.

Gate 135 is operated by a link 145 that is connected to a lever 146 which is fixed to one end of a shaft having a cam plate 147 secured to its other end and overlying the conveyor 32—32. As a pin passes under cam plate 147 this plate is raised by the pin causing lever 146 to swing upwardly raising link 145 and effecting the opening of gate 135, thereby causing a pin to be discharged from chute 132 into one of the pin pockets 134.

The drive for belt 133 is taken from shaft 22. A belt 136 is driven from shaft 22 and this belt drives a shaft 137 that is adapted to drive a sprocket shaft 138 by means of a clutch 140 and gearing 141 (see especially Figs. 5 and 6). Sprockets 142 on shaft 138 drive the transverse belt 133. The clutch 140 tends at all times to be operative and is held inoperative when a lever 143 abuts a lug 144 provided on this clutch.

Lever 143 is actuated by a rod 148 which is pivotally connected at its upper end to one end of a lever 149 which is pivotally supported at 151 and has its other end connected to gate 135 (see Fig. 3). As gate 135 is opened by the action of cam plate 147 permitting a pin to drop from chute 132 into a pin pocket 134 of belt 133, the lever 149 moves rod 148 downwardly, causing lever 143 to disengage lug 144 of clutch 140. Clutch 140 thereupon drives the belt 133 so that the next succeeding pin pocket 134 is moved under the discharge mouth of chute 132. The gearing 141 is designed so that the belt 133 moves the width of a single pin pocket when the clutch 140 makes a single revolution, its motion being stopped at the end of such revolution by lever 143 again contacting with lug 144. A tension spring 150 urges rod 148 and lever 143 upwardly at all times so that as soon as a pin passes cam plate 147 the lever 143 functions to disengage clutch 140 as soon as the lug 144 completes a revolution.

A pawl 167 provided on clutch 140 cooperates with a ratchet wheel 152 rotatably mounted on the shaft 138. Ratchet wheel 152 has ten teeth which cooperate with pawl 167 and has another offset tooth 153 on its hub which cooperates with one end of a plunger 154. Plunger 154 extends through a casing 155 and has its other end connected to the operating arm of a switch 156. Switch 156 is urged to closed position by the action of a compression spring 157 within casing 155. Spring 157 urges plunger 154 toward the left, as viewed in Fig. 5, closing switch 156 unless such motion is prevented either by the action of tooth 153 or by a latch rod 158. Latch rod 158 is slidably supported within a guide aperture provided in a transverse lug 159 formed on casing 155 and has an overhanging end portion 160 projecting inwardly through an aperture in casing 155 into cooperative relation with the plunger 154. An annular groove 161 is provided in plunger 154. A spring 162 (see Fig. 1) urges the end portion 160 into engagement with plunger 154 and when tooth 153 moves plunger 154 against the tension of spring 157 to open switch 156, the groove 161 moves into registration with the end portion 160 resulting in this end portion snapping into groove 161, thereby holding switch 156 in open position.

Since there are ten teeth on ratchet wheel 152 which cooperate with pawl 167, it follows that the clutch 140 makes ten revolutions before the tooth 153 engages plunger 154 to effect the opening of switch 156. Therefore, ten pins are picked up by belt 133 and arranged in alignment with the ten pin chutes 73 before the switch 156 is opened. As will appear later, switch 156 controls the circuit for electro-magnet 29 which is employed to engage clutch 25, which clutch drives shaft 26, so that when switch 156 is opened, the conveyor 32—32 and elevator 30 cease operating as desired, since ten pins are positioned in the pockets 134 ready to be discharged into the pin chutes 73.

A pin sweep 164 (see Figs. 2 and 3) is employed for pushing the ten pins positioned in pockets 134 into the chutes 73 when desired. Pin sweep 164 is pivotally supported near its upper end upon a transverse rod 165. Pin sweep 164 is operated by an electro-magnet 168 having a hinge pointed armature 166 connected to the pin sweep. A tension spring 170 has one end connected to a fixed support and its other end connected to the pin sweep at a point above its pivotal connection with rod 165. Spring 170 urges the pin sweep into its inoperative position and away from the pin pockets 134. A pin 171 is carried by pin sweep 164 (see Fig. 1) and is adapted to abut a head 172 provided on latch rod 158.

When electro-magnet 168 is energized, the spotter being down, the pin sweep 164 is pulled toward the right as viewed in Fig. 3, thereby sweeping the ten pins in the pin pockets 134 into the chutes 73. As soon as electro-magnet 168 is deenergized, the tension spring 170 swings the pin sweep back to its normal position, the momentum of the pin sweep causing its pin 171 to strike the head 172 of latch rod 158 with such force as to dislodge end portion 160 from groove 161, thereby permitting spring 157 to close switch 156 energizing electro-magnet 29. The energizing of this electro-magnet effects the gripping of clutch 25 and starts the drive for conveyor 32—32 and elevator 30 so that ten pins taken from slideway 37 are again stored in the pin pockets 134 preparatory for use.

Referring now to the wiring diagram of Fig. 16, the motor 20 is supplied from current supply leads 173 and 174 through a manually operated switch 175. It will be noted that the various switches and their controlled apparatuses are connected to the supply leads 173 and 174 and are positioned on the wiring diagram in positions corresponding as nearly as practicable to the relative positions in which they are found in the pin setting machine as viewed in plan similarly to Fig. 1.

A control box 176 is provided at a convenient location and contains electro-magnets 177 and 178, the armatures of which are arranged to operate switches 180, 181 and 182, respectively. Switches 180, 181 and 182 are of the ratchet type and hence the energization of their respective electro-magnets, causing movement of their armatures, effects either the opening or the closing of these switches, depending upon their prior condition. Thus, if switch 182 is closed, the energization of its electro-magnet 178 will open this switch, and the second energization of this electro-magnet will again close this switch. When the spotter is at its highest position with ten pins set up on the alley floor, these respective switches are initially set so that switch 180 is closed and switches 181 and 182 are open.

It will be noted that switch 15, when closed, energizes electro-magnet 168 to operate the pin sweep. When switch 16 is closed it will cause the energization of electro-magnet 89 and operate the bar 83 which is pivoted on the frame 79. The closing of switch 112 results in the energization of magnetic plate 100. The closing of switch 127 results in the energization of electro-magnets 71 and 178. Electro-magnet 71 effects the raising of spotter platform 76, and the energization of electro-magnet 178 effects an operation of switch 182. The closing of switch 75 results in the energization of electro-magnet 71', thereby affecting the raising of the spotter platform 76. The closing of switch 14 completes a circuit for electro-magnets 60 at the sides of the machine which effects the operation of the alley sweeps 57.

A manual switch 183 is located at the bowler's position, at the head of the alley, and this switch is included in a circuit with the electro-magnets 60, switch 18, switch 19 and switch 180. In the event that the alley sweeps 57 are not working and are therefore positioned at the sides of the alley, switch 16 will be closed. Also, providing the spotter platform is at its upper limit of travel, switch 19 will be closed, and switch 180 is also closed, then switches 18, 19 and 180 are all closed, and the manual switch 183 may be used to energize electro-magnets 60 effecting the operation of the alley sweeps, thereby clearing the alley when desired. Electro-magnets 60 are also included in a circuit which includes switch 12 and switch 181. When switches 12 and 181 are closed, the alley sweeps are also operated. Electro-magnets 60 are also included in a circuit including switch 13 and switch 182 so that when these switches are closed the alley sweeps are operated.

Electro-magnet 69 is included in a circuit with switches 11 and 180 so that when these switches are both closed this electro-magnet operates to lower the spotter. Electro-magnet 177 in the control box is included in a circuit with switches 182 and 13 so that when these switches are closed electro-magnet 177 will be energized to operate switches 180 and 181. The closing of switch 17 establishes a circuit for electro-magnet 69′, thereby effecting the lowering of the spotter. The closing of switch 156 establishes a circuit for electro-magnet 29 effecting the gripping of clutch 25. Switches 11, 12, 14, 16, 17, 15, 75, 127, 13 and 156 are snap switches, whereas switches 182, 180, 181 and 112 are ratchet switches.

In operation, the motor 20 drives the shaft 22 continuously and hence shafts 44 and 47. The crank arm 48 does not revolve, however, unless clutch 49 is engaged. Elevator 35 operates continuously to pick up any balls or pins on the alley pit floor 36 constituting a primary pit and delivers the same to the slideway 37 constituting a secondary pit from whence balls are delivered to the player's position at the head of the alley and pins are delivered to the pin elevator 30. Elevator 30 and the V-shaped conveyor 32 do not operate unless clutch 25 is engaged.

Assuming that the alley is in use and that a player hits ten pins making a strike, then the ball used is picked up from the primary pit by elevator 35 and delivered to ball guideway 38 in the secondary pit which guideway conducts the same back to the player's position. As the ball moves along guideway 38 it strikes the operating arms of switches 11 and 12, thereby momentarily closing these switches. The closing of switch 12 has no effect since switch 181 is open at this time. The closing of switch 11 causes the energization of electro-magnet 69 which operates to lift armature 70 causing the engagement of clutch 49 and effecting a half revolution of crank arm 48 from its highest position shown in Fig. 3 to its lowest position, whereupon its motion is stopped by the lug 63 contacting with hinged arm 66. During this motion of the crank arm, it turns in a clockwise direction, as viewed from the front of the machine, causing the lowering of the spotter toward the alley floor. The complete movement of the spotter platform 76 to the alley floor is prevented, however, by the action of bar 83, the shoulder 84 of which engages bracket 85 and supports the platform 76 at a sufficient distance above the alley floor, which would ordinarily be about five inches, so as to clear the pins which are all down. During the latter part of the movement of the crank arm 48, the stud 82 slides idly in slot 81 but does not strike the operating arm of switch 127 since the platform 76 and arm 80 have moved too low to permit such engagement. During the downward motion of the spotter, the cam plate 115 engages the operating arm of switch 14 and closes this switch, thereby energizing the electro-magnets 60—60 at the sides of the alley and effecting the operation of the alley sweeps 57 which act to clear the alley floor of the pins lying thereon.

As one of the alley sweeps 57 returns to its initial inoperative position, the lever 116 strikes the operating arms of switches 16, 17 and 18, thereby closing these switches. The closing of switch 17 results in the energization of electro-magnet 69′ which acts to lift armature 70. This has no effect, however, since lug 63 is at this time in engagement with arm 66. The closing of switch 18 has no effect, since the manual switch 183 is open. The closing of switch 16 causes the energization of electro-magnet 89 which effects the release of shoulder 84 of bar 83 from bracket 85, resulting in the dropping of the spotter platform 76 to the alley floor 42. During this latter motion of the spotter platform, the cam plate 115 strikes the operating arm of switch 15, thereby closing this switch and effecting the energization of electro-magnet 168.

This electro-magnet draws inwardly upon armature 166 and effects operation of pin sweep 164, resulting in ten pins being deposited in the chutes 73 which pins are conveyed by these chutes and spotting tubes 74 to their proper position upon the alley floor. As pin sweep 164 returns to its inoperative position, it causes the disengagement of latch rod 158 from recess 161 in plunger 154 and effects the closing of switch 156 which results in the operation of the V-shaped conveyor 32—32 and the replacement of ten pins in the pin pockets 134, the pins being taken from the secondary pit by elevator 30 as heretofore described.

As one of the pins moves through its chute 73 and spotter tube 74′ it operates switch 75 which completes a circuit for electro-magnet 71′, which electro-magnet pulls down armature 72, thereby releasing lug 63 of clutch 49 from arm 66 causing crank arm 48 to turn upwardly a one-half revolution to its initial position. Crank arm 48 acting through arm 80 and frame 79 raises the spotter to its highest position, leaving ten pins in proper position on the alley floor 42 preparatory to another cycle of operation of pin-setting machine. As the spotter approaches its highest position, it momentarily closes switch 13. The closing of switch 13 has no effect since switch 182 is open. When the spotter reaches its highest position it closes switch 19. The closing of switch 19 has no effect since the manually operated switch 183 is open. The player by operating switch 183 can establish a circuit for electro-magnets 60—60, thereby clearing the alley if desired. Such circuit extends through electro-magnets 60 and switches 183, 18, 19 and 180.

Assuming that the player hits less than ten pins on the first ball, for example, seven pins, there will be left three standing pins. The ball is picked up from the primary pit by elevator 35 and delivered to ball guideway 38, whereupon it is returned to the player's position, operating switches 11 and 12 during such movement. The operation of switch 12 has no effect, since switch 181 is open. The operation of switch 11 causes the energization of electro-magnet 69 which engages clutch 49 to lower the spotter.

During the first portion of the downward movement of the spotter, the magnetic plate apertures 105 are out of alignment with spotting tubes 74. This is always true whenever the spotter goes down, and the apertures 105 remain out of alignment with the spotting tubes until brackets 106 approach the pivotal connections 108, whereupon these brackets are thrust inwardly against the tension of springs 110 so that when the brackets 106 pass pivotal connections 108 the springs 110 urge the magnetic plate into aligned relation with the platform 76 and the apertures 105 into alignment with the spotting tubes. Since the tops of the standing pins are above the pivotal connections 108, the downwardly moving magnetic plate comes to rest on the tops of the standing pins with the apertures 105 offset with respect to the spotting tubes, a bracket 106 having actuated arm 113 to close switch 112 during such downward movement. At this time the shoulder 84 of bar 83 is still positioned above the bracket 85. Crank 48 makes a one-half revolution, even though the downward movement of the spotter is limited by resting upon the standing pins, and therefore during the latter part of its motion, the crank 48 causes its stud 82 to move in slot 81. Just before stud 82 comes to rest, it strikes the operating arm of switch 127 which effects the energization of electro-magnets 71 and 178.

Electro-magnet 71 operates clutch 49 to effect the raising of the spotter. As the spotter moves upwardly, the energized magnetic plate 100 moving therewith, raises the three standing pins upwardly. Electro-magnet 178 operates switch 182 to closed position preparatory to the closing of switch 13. As the spotter reaches its highest position it operates switches 13 and 19. Switch 19 has no effect since the manually operated switch 183 is open. The closing of switch 13 completes the circuit for electro-magnet 177 which circuit extends through closed switch 182. The energization of electro-magnet 177 operates switch 180 to open position and switch 181 to closed position. Switch 13 also completes a circuit for electro-magnets 60 which results in the operation of the alley sweeps to clear the alley of the seven knocked down pins. The opening of the switch 180 disconnects switch 11 from the supply lead 173 and the closing of switch 181 connects switch 12 to supply lead 173. The closing of switch 181 also provides a holding circuit for electro-magnet 177.

As one of the alley sweeps returns to its initial position, at the side of the alley, its lever 116 operates switches 16, 17 and 18. Switch 16 energizes electro-magnet 89 which causes operation of bar 83 but this has no effect since the spotter is up. The energization of switch 18 has no effect, the manual switch 183 being open.

The closing of switch 17 effects the energization of electro-magnet 69' which results in the dropping of the spotter until the three pins rest upon the alley floor. During the downward movement of the spotter, a bracket 106 operates arm 113 of switch 112, thereby opening this switch and deenergizing the magnetic plate 100. The crank stud 82 moving in slot 81 strikes the operating arm of switch 127, thereby energizing electric-magnets 71 and 178. The energization of electro-magnet 71 effects the raising of the spotter and the energization of electro-magnet 178 effects the operation of switch 182 to open position. The opening of switch 182 disconnects switch 13 from line 173 so that when this switch is closed by cam plate 115 as the spotter reaches its highest position no circuit is completed.

The spotter is up and three pins are now on the alley floor and the player rolls another ball which is picked up by elevator 35 and delivered to ball guideway 38. This ball operates switches 11 and 12. The operation of switch 11 has no effect since switch 180 is open, but switch 12 completes a circuit for coil 60 resulting in the operation of the sweeps to clear the alley of the pins. This circuit for electro-magnets 60 extends through switch 12 and switch 181. The closing of switch 12 also completes the circuit for electro-magnet 177, which circuit extends through switch 181, electro-magnet 177, switch 12 and switch 181. The energization of electro-magnet 177 effects the closing of switch 180 and the opening of switch 181.

As one of the sweeps returns to its initial position, at the sides of the alley, it operates the switches 16, 17 and 18. Switches 16 and 18 have no effect, and switch 17 energizes electro-magnet 69' resulting in the lowering of the spotter. As the spotter moves down it operates switch 14 which completes a circuit for the alley sweeps. As one of these sweeps returns to off position it completes a circuit for electro-magnet 89 by closing switch 16, thereby releasing bars 83 and permitting the spotter to descend to the floor. As the spotter moves to the alley floor, cam plate 115 operates switch 15 to energize electro-magnet 168, thereby operating the pin sweep to again deliver pins into the chutes 73 through which they are conveyed to their proper places on the alley floor. As one of the pins passes switch 75 it operates this switch to energize electro-magnet 71' and again raise the spotter. As the spotter reaches its highest position switches 13 and 19 are operated. Switch 13 has no effect since switch 182 is open and switch 19 also has no effect since switch 183 is open. The alley is now ready for another cycle of operations.

It will be noted that the novel pin-setting machine of this invention is entirely automatic in its operation and serves to properly position or spot the pins upon the alley floor, to completely clear this floor after a strike or to remove dead pins from this floor after a spare, and to finally remove all dead pins from the floor after the second ball, the pins being recirculated for further use and the balls being returned to the player at the head of the alley.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. In combination with a bowling alley having a primary pit at the rear of the alley and a secondary pit positioned above said primary pit, of a pin-setting machine therefor, said pin-setting machine comprising an elevator for conveying balls and pins from said primary pit to said secondary pit, guide means for segregating the balls from the pins within said secondary pit and for returning the balls to the head of the alley, pin conveyor means, a second elevator for conveying pins from said secondary pit to said pin conveyor means, a plurality of pin pockets movable transversely of said alley, said pin conveyor means operating to deliver pins in succession to said pin pockets, and a vertically movable spotter having pin chutes movable into alignment with said pin pockets and arranged to convey pins from said pockets to desired upright positions on said alley.

2. In combination with a bowling alley having a pit at the rear thereof, of a pin-setting machine therefor, said pin-setting machine comprising elevator means for conveying balls and pins upwardly from said pit, ball segregating and guiding means for receiving balls from said elevator means and for returning the balls to the player's position, an intermittently operated pin conveyor means for receiving pins from said elevator means and for conveying the pins to the forward part of the machine, an intermittently driven transverse belt positioned adjacent the discharge end of said conveyor means and having pin receiving spaces for receiving pins delivered by said conveyor means, control means for regulating the operation of said pin conveyor means and said transverse belt, whereby said pin conveyor means functions to deliver a plurality of pins in succession to said belt and then ceases to function, a plurality of pin chutes movable so that their inlet ends are aligned with the pin receiving spaces of said transverse belt and means for sweeping pins from said pin receiving spaces into said chutes wherein they are conveyed to desired upright positions on said alley, said control means acting after the operation of said pin sweeping means to cause said pin conveyor means to function to deliver another plurality of pins in succession to said belt.

3. In combination with a bowling alley having a pit at the rear thereof, of a pin-setting machine therefor, said pin-setting machine comprising elevator means for conveying balls and pins upwardly from said pit, ball segregating and guiding means for receiving balls from said elevator means and for returning the balls to the player's position, an intermittently operated pin conveyor means for receiving pins from said elevator means and for conveying the pins to the forward part of the machine, an intermittently driven transverse belt positioned adjacent the discharge end of said conveyor means and having pin receiving spaces for receiving pins delivered by said conveyor means, control means for regulating the operation of said pin conveyor means and said transverse belt, whereby said pin conveyor means functions to deliver a plurality of pins in succession to said belt and then ceases to function, a vertically movable platform, said platform being movable from engagement with said alley to a position higher than the tops of pins standing on said alley, a plurality of chutes carried by said platform, the inlet ends of said chutes being aligned with the pin receiving spaces of said transverse belt when said platform rests on said alley, and means for sweeping the pins carried by said belt into said chutes to be delivered by the discharge ends of said chutes in desired positions upon the alley.

4. In combination with a bowling alley having a pit at the rear thereof, of a pin-setting machine therefor, said pin-setting machine comprising elevator means for conveying balls and pins upwardly from said pit, ball segregating and guiding means for receiving balls from said elevator means and for returning the balls to the player's position, an intermittently operated pin conveyor means for receiving pins from said elevator means and for conveying the pins to the forward part of the machine, an intermittently driven transverse belt positioned adjacent the discharge end of said conveyor means and having pin receiving spaces for receiving pins delivered by said conveyor means, control means for regulating the operation of said pin conveyor means and said transverse belt, whereby said pin conveyor means functions to deliver a plurality of pins in succession to said belt and then ceases to function, a vertically movable platform, said platform being movable from engagement with said alley to a position higher than the tops of pins standing on said alley, a plurality of chutes carried by said platform, the inlet ends of said chutes being aligned with the pin receiving spaces of said transverse belt when said platform rests on said alley, means for sweeping the pins carried by said belt into said chutes to be delivered by the discharge ends of said chutes in desired positions upon the alley, alley sweeps operable to clear said alley, and means carried by said platform for raising standing pins off of said alley before certain operations of said alley sweeps, said raised pins being lowered to the alley by the lowering of said platform after the operation of said sweeps.

5. In combination with a bowling alley having a primary pit at the rear thereof and a secondary pit positioned above said primary pit, of an automatic pin-setting machine, said pin-setting machine comprising an elevator for raising balls and pins from said primary pit to said secondary pit, guide means for segregating the balls from the pins within said secondary pit and for returning the balls to the head of the alley, pin conveyor means, a second elevator for conveying pins from said secondary pit to said pin conveyor means, pin setting mechanism, said pin conveyor means acting to convey pins to said pin setting mechanism, means for sweeping the alley of dead pins after the first ball and of all pins after the second ball, and magnetic means associated with said pin setting mechanism for effecting the raising of standing pins after the first ball and the lowering thereof after an operation of said pin sweeping means, and electric control means for effecting the desired sequence of operations of said pin-setting machine.

6. An automatic pin-setting machine for a bowling alley comprising, pin-setting mechanism, means for sweeping the alley of dead pins, a continuously operable ball return means, means for returning pins to said pin-setting mechanism, and automatic electric control means initiated by the return movement of a bowling ball for effecting the desired sequence of operations of said pin-setting mechanism, said pin sweeping means and said ball and pin return means.

7. An automatic pin-setting machine for a bowling alley comprising, pin chutes arranged for setting up pins in desired positions on the bowling alley, means for sweeping the alley of dead pins after the first ball and of all pins after the second ball, guide means for returning balls to the head of the alley, conveying means for conducting pins cleared from the alley to said pin chutes, and automatic electric control means operating in response to movements of bowling balls and pins for effecting the desired sequence of operations of said pin-setting machine whereby manual control of the sequence of operations of said machine is eliminated.

8. An automatic pin-setting machine for a bowling alley comprising, pin chutes arranged for setting up pins in desired positions on the bowling alley, means for sweeping the alley of pins, means for causing the raising of standing pins after the first ball until said sweeping means has operated, means for causing the lowering of said standing pins to the alley floor after the operation of said sweeping means, said sweeping means operating after the second ball to remove all pins from the alley, guide means for returning balls to the head of the alley, continuously running conveyor means for delivering balls to said guide means, conveying means for conducting pins cleared from the alley to said pin chutes, and automatic electric control means initiated by the return movement of a bowling ball for effecting the desired sequence of operations of said pin-setting machine.

9. In an automatic pin-setting machine for a bowling alley having an alley floor, a pin-setting mechanism comprising, a platform movable vertically upwardly from said bowling alley floor, said platform extending transversely of the bowling alley and having pin discharge apertures therein, a plurality of pin chutes fixedly carried by said platform, said chutes having their discharge ends communicating with said discharge apertures, means for depositing pins in said chutes when said platform is on said alley floor, said chutes serving to convey the pins to and directly through said discharge apertures into upright desired positions on the alley floor, and a magnetic plate carried by said platform for raising standing pins.

10. In an automatic pin-setting machine for a bowling alley, a pin-setting mechanism comprising, a platform movable vertically upwardly from said bowling alley, said platform extending transvelsely of the bowling alley and having pin discharge apertures therein, a plurality of pin chutes carried by said platform, said chutes having their discharge ends communicating with said discharge apertures, means for depositing pins in said chutes when said platform is on said alley, said chutes serving to convey the pins to and through said discharge apertures into upright desired positions on the alley floor, a crank for raising and lowering said platform and means for supporting said platform at an intermediate position while it is being lowered.

11. In an automatic pin-setting machine for a bowling alley, a pin-setting mechanism comprising, a platform movable vertically upwardly from said bowling alley, said platform extending transversely of the bowling alley, and having pin discharge apertures therein, a plurality of pin chutes carried by said platform, said chutes having their discharge ends communicating with said discharge apertures, means for depositing pins in said chutes with said platform on said alley, said chutes serving to convey the pins to and through said discharge apertures into upright desired positions on the alley floor, a crank for raising and lowering said platform, means for supporting said platform at an intermediate position while it is being lowered, a magnetic plate slidably attached to the underside of said platform and having apertures aligned with said platform discharge apertures, and means for offsetting said magnetic plate with respect to said platform during a portion of the downward movement of said platform so that the apertures of said plate are unaligned with said platform discharge apertures, whereby said platform is brought to rest at another intermediate position by any standing pins on the alley.

12. In an automatic pin-setting machine, a bowling pin conveyor, a chute into which said conveyor discharges, a gate closing the discharge end of said chute, a belt having pin receptacles therein, and mechanism, operated by a bowling pin passing along said pin conveyor, for opening said gate and causing a pin to be discharged from said chute into one of said pin receptacles.

13. In an automatic pin-setting machine, a bowling pin conveyor, a chute into which said conveyor discharges, a gate closing the discharge end of said chute, a belt having pin receptacles therein, mechanism, operated by a bowling pin passing along said pin conveyor, for opening said gate and causing a pin to be discharged from said chute into one of said pin receptacles, gearing for driving said belt and a clutch connected in operative driving relation with said gearing, said mechanism controlling the operation of said clutch to effect movement of said belt the width of a single pin receptacle after a pin has been discharged from said chute.

14. In an automatic pin-setting machine, a bowling pin conveyor, a chute into which said conveyor discharges, a gate closing the discharge end of said chute, a belt having pin receptacles therein, mechanism, operated by a bowling pin passing along said pin conveyor, for opening said gate and causing a pin to be discharged from said chute into one of said pin receptacles, gearing for driving said belt, a clutch connected in operative driving relation with said gearing, said mechanism controlling the operation of said clutch to effect movement of said belt the width of a single pin receptacle after a pin has been discharged from said chute, pawl and ratchet means connected to said gearing, and switch means operable by said pawl and ratchet means to stop said conveyor after a predetermined number of pins have been deposited in said pin receptacles.

In testimony, that I claim the invention set forth above I have hereunto set my hand this 4th day of December, 1929.

WILLIAM WHITE.